US012791807B2

(12) United States Patent
Billor et al.

(10) Patent No.: US 12,791,807 B2
(45) Date of Patent: Nov. 10, 2026

(54) INTERLOCK MECHANISM FOR OPTICAL FIBERS

(71) Applicant: Microsoft Technology Licensing, LLC, Redmond, WA (US)

(72) Inventors: Denizcan Billor, Seattle, WA (US); Binbin Guan, Issaquah, WA (US); Yawei Yin, Redmond, WA (US); Jamie Gaudette, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 18/518,119

(22) Filed: Nov. 22, 2023

(65) Prior Publication Data

US 2025/0164721 A1 May 22, 2025

(51) Int. Cl.
*G02B 6/42* (2006.01)
*G02B 6/38* (2006.01)

(52) U.S. Cl.
CPC ......... *G02B 6/4292* (2013.01); *G02B 6/3897* (2013.01)

(58) Field of Classification Search
CPC ... G02B 6/3897; G02B 6/3849; G02B 6/4292
See application file for complete search history.

(56) References Cited

U.S. PATENT DOCUMENTS 6,423,963 B1 7/2002 Wu
2002/0098732 A1 7/2002 Shimizu
2003/0002145 A1 1/2003 Chitani
2007/0173108 A1 7/2007 Niwa
2008/0232746 A1* 9/2008 Frith .................... G02B 6/4298 385/88

(Continued)

FOREIGN PATENT DOCUMENTS

CN 210326472 U 4/2020
CN 215953914 U 3/2022
EP 4053609 A1 9/2022

(Continued)

OTHER PUBLICATIONS

International Search Report and Written Opinion received for PCT Application No. PCT/US2024/051691, mailed on Feb. 4, 2025, 17 pages.

(Continued)

*Primary Examiner* — Michael P Mooney

(57) ABSTRACT

Examples of the present disclosure describe an interlock mechanism for optical fibers. A protective enclosure for selectively covering a manual release mechanism of an optical fiber connector is described. In some examples, an optical system includes the protective enclosure, a mechanical actuator, and an optical device, among other components. A user interacts with the mechanical actuator to move the protective enclosure to a covered position or an uncovered position, disallowing or allowing, respectively, physical access to the manual release mechanism. The user's interaction with the mechanical actuator also concurrently turns the optical device on, off, or to a different power level, which provides, stops, or reduces the power of, respectively, optical signals provided to the optical fibers via the optical connector.

20 Claims, 6 Drawing Sheets

(56) References Cited

U.S. PATENT DOCUMENTS

| | | | |
|---|---|---|---|
| 2021/0389530 | A1 | 12/2021 | Rathinasamy |
| 2022/0285896 | A1 | 9/2022 | Niebauer |

FOREIGN PATENT DOCUMENTS

| | | | |
|---|---|---|---|
| JP | H02208609 | A | 8/1990 |
| WO | 2012106907 | A1 | 8/2012 |

OTHER PUBLICATIONS

International Preliminary Report on Patentability (Chapter I) received for PCT Application No. PCT/US2024/051691, mailed on Jun. 4, 2026, 11 pages.

* cited by examiner

INTERLOCK MECHANISM FOR OPTICAL FIBERS

Optical fibers (e.g., fiber optic cables) are a type of fiber that transmits data as light pulses along a glass or plastic fiber core, surrounded by a layer called cladding. These fibers have revolutionized telecommunications and data networking by providing high bandwidth and low signal loss, making them ideal for long-distance communication and high-speed data transmission. Hollow core fibers (HCFs) are a specialized type of optical fiber in which at least a portion of the core is hollow or filled with a gas, allowing for lower latency and reduced signal loss compared to traditional solid core fibers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe an interlock mechanism for optical fibers. In examples, the technology described herein includes a protective enclosure for selectively covering a manual release mechanism of an optical fiber connector. For instance, an optical transmission or communication system may include the protective enclosure, a mechanical actuator, and an optical light source (e.g., a laser, an optical amplifier), among other components. A user interacts with the mechanical actuator to move the protective enclosure to a covered position or an uncovered position, disallowing or allowing, respectively, physical access to the manual release mechanism. The user's interaction with the mechanical actuator also turns the optical device on, off, or to a different power level. For example, when a user moves the mechanical actuator to a first position, the optical device is turned off and the protective enclosure is concurrently moved to the uncovered position. In another example, when a user moves the mechanical actuator to a second position, the protective enclosure is moved to the covered position and the optical device is concurrently turned on.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
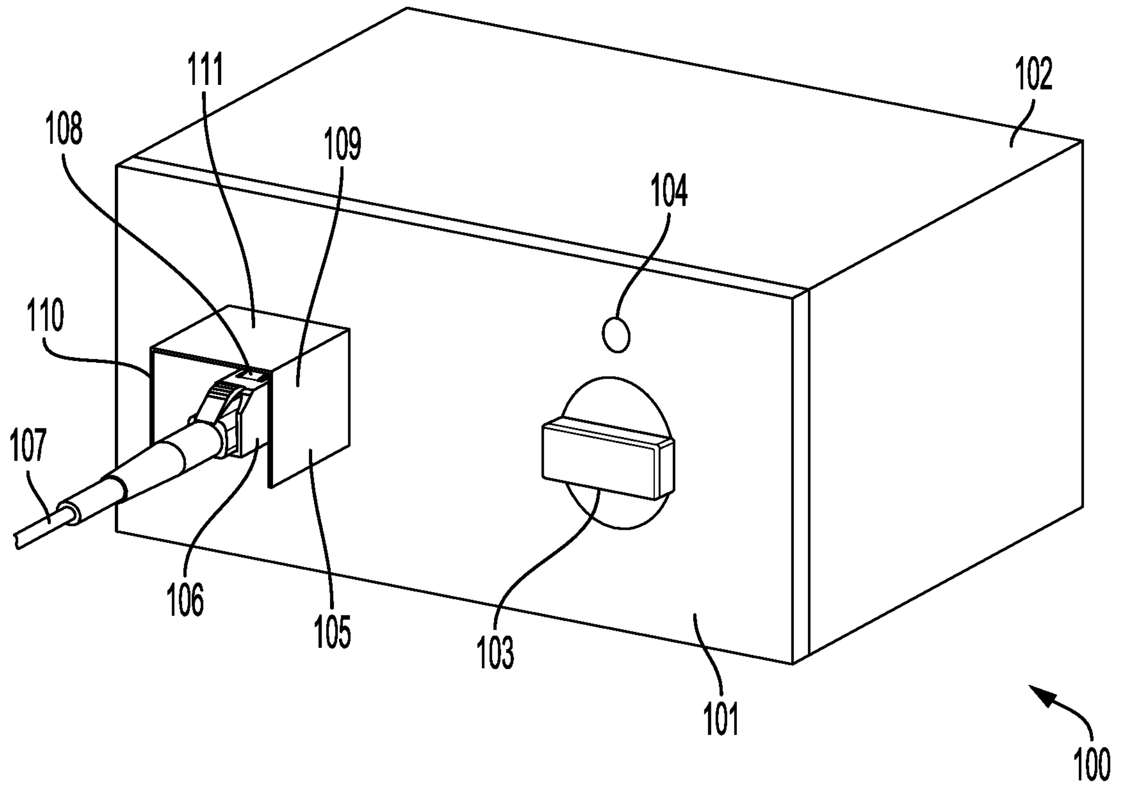
FIG. 1 illustrates an example optical system in accordance with aspects of the disclosure.

Improper handling of hollow-core fibers (HCFs) in high-power optical device applications (e.g., a laser, an optical amplifier) can pose serious safety risks, especially when attaching or detaching optical connectors. Detaching optical connectors/fibers while an optical device is still on and emitting light poses a particular safety risk. For instance, the laser light emitting from the optical light source or escaping from the fiber can cause permanent eye damage, including retinal injury, if it enters the eye. As an example, fiber optic communications often occur in the non-visible spectrum (e.g., infrared spectrum). As a result, when an optical fiber is disconnected, a technician may not be able to readily discern if light is currently being emitted. In traditional fiber optic applications, the emitted light has limited potential for harm due to the relative low power of the emitted light. With the introduction of HCF, however, the light-transmission power can be greatly increased, resulting in laser light being emitted in at least the Class III or Class IV safety categories. Direct viewing of such light may cause eye damage to technician. Thus, a solution that prevents someone from detaching an optical connector/fiber when the optical device is emitting such light is desirable.

To mitigate this problem, a safety interlock mechanism for optical fibers is disclosed herein. In examples, the interlock safety mechanisms include a mechanical actuator (e.g., knob, switch dial) that concurrently controls two functions. The first function is to move a protective enclosure to prevents an optical connector from being disconnected while the light source is active. The second function is to control the power or operation of the light source. Accordingly, when the mechanical actuator is moved to an "on" position, the protective enclosure moves to a covered position that prevents disconnection of the optical fiber, and the light source is powered. When the mechanical actuator is moved to an "off" position, the protective enclosure moves to an uncovered position where the optical fiber can be disconnected, and power for the light source is removed or reduced (e.g., the light source is powered off).

As an example, optical connectors (e.g., an LC connector) commonly include a manual release mechanism (e.g., a push-down component, threaded connector) where a user pushes down to unlock and detach the optical connector. The protective enclosure disclosed herein and the associated system prevents a user from physically accessing the manual release mechanism when the optical device is on and emitting potentially dangerous amounts of light. The protective enclosure then moves and allows a user to access the manual release mechanism when the optical device is off. Such features are effective in mitigating improper handling of HCFs.

In some examples, the protective enclosure rotates away to grant access to the manual release mechanism, or the protective enclosure moves away linearly to grant access to the manual release mechanism. The protective enclosure may be coupled via mechanical linkage to a mechanical actuator (e.g., an input component, a dial, a knob, a sliding linear mechanical lever), so that when the user interacts with the mechanical actuator, the mechanical energy from the mechanical actuator is transferred, via the mechanical linkage, to move the protective enclosure (e.g., either rotationally or linearly). In other examples, the protective enclosure is moved by one or more electro-mechanical devices (e.g., one or more motors, one or more linear actuators) via one or more hinges or sliding linear mechanical lifts, and the electro-mechanical devices are provided with electrical signals when a user moves the mechanical actuator. When a user interacts with the mechanical actuator, the mechanical actuator provides other electrical signals to the optical device to turn off/on the optical device. For example, when the mechanical actuator is in a first position, the protective enclosure covers the manual release mechanism and the optical device is turned on, and when the mechanical actuator is in a second position, the protective enclosure uncovers the manual release mechanism and the optical device is turned off or reduced in power.

FIG. 1 illustrates an example optical system 100 in accordance with aspects of the disclosure. Optical system 100 includes faceplate 101, storage container 102, mechanical actuator 103, indicator light 104, and protective enclosure 105. The system 100 further includes a fiber 107 that terminates on one end with an optical connector 106 that includes a manual release mechanism 108. The scale and structure of systems and devices discussed herein may vary and may include additional or fewer components than those described in FIG. 1 and subsequent figures.

Faceplate 101 is coupled to storage container 102 and serves as a front cover for storage container 102. Storage container 102 is a container that includes one or more devices or components as discussed in FIGS. 2-4. For instance, the storage container 102 may be a rack-mountable container, and faceplate 101 serves as the front cover when the storage container is mounted in the rack. The faceplate 101 also serves as an interface onto which mechanical actuator 103, indicator light 104, protective enclosure 105, and optical connector 106 are coupled or integrated.

Figure 5A:
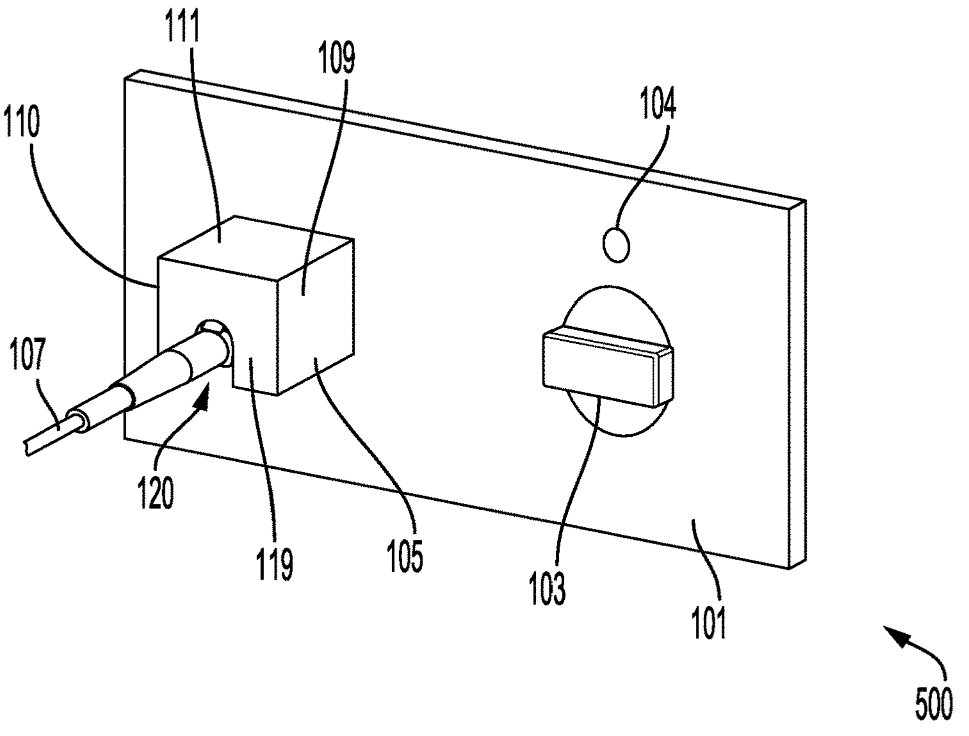
FIG. 5A illustrates an example optical system in accordance with aspects of the disclosure.
Figure 5B:
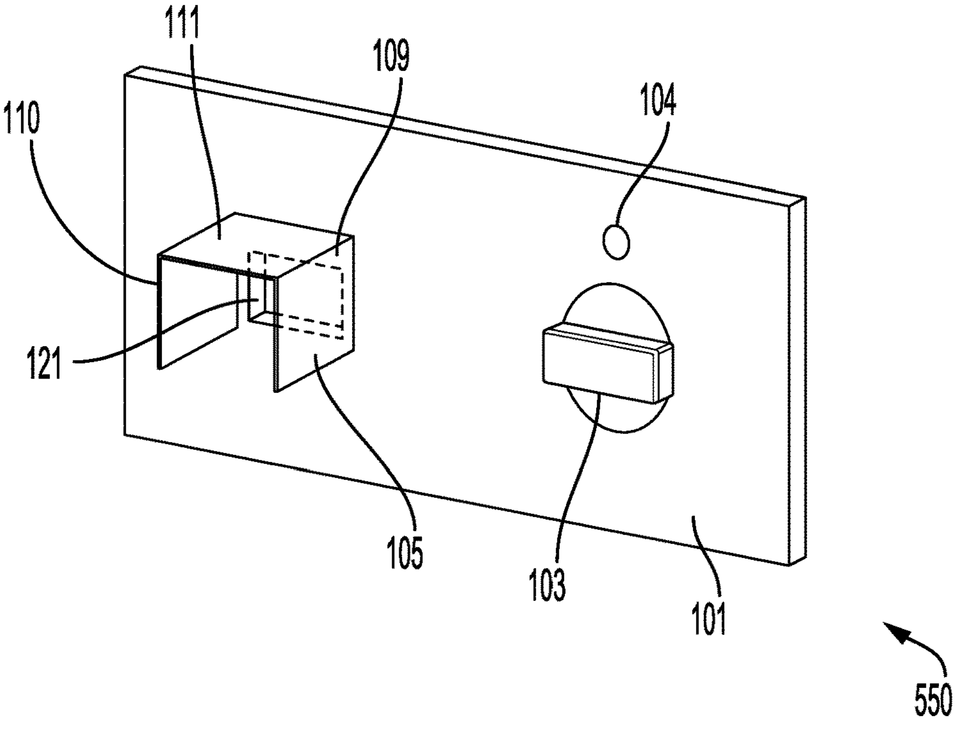
FIG. 5B illustrates an example optical system in accordance with aspects of the disclosure.

Faceplate 101 includes an opening or receptacle to receive the optical connector 106 to interface with an optical device (see FIG. 5B for an example receptacle). For instance, the opening may be a port that is configured to receive the connector 106 and temporarily retain the connector 106. As an example, the connector 106 may be an LC connector with a manual release mechanism 108 is the form of a push release (e.g., a spring-loaded component that when pressed down releases the connector 106 from the port of the faceplate 101). Faceplate 101 may be constructed of any material or combination of materials, such as plastics, metals, ceramics, or the like.

Mechanical actuator 103 is a component configured to receive an input from a user. Mechanical actuator 103 includes or is an input component, such as a dial, a knob, a sliding linear mechanical lever, or the like. For instance, in examples where the mechanical actuator 103 is a dial, a user is able to turn the dial to one or more positions. Although a dial is illustrated, it is appreciated that other mechanical actuators configured to receive a user input may be used instead. In some examples, the mechanical actuator 103 may be a keyed actuator that requires a key to control the movement of the mechanical actuator 103. For instance, the mechanical actuator 103 may include a key slot that receives a key. Once the key is received into the key slot, the mechanical actuator 103 may be manually manipulated or moved (e.g., turned or rotated).

Indicator light 104 is configured to light up in one or more configurations based on the position of the mechanical actuator 103. For example, indicator light 104 illuminates in a first configuration (e.g., a first color) when mechanical actuator 103 is in a first position, and illuminates in a second configuration (e.g., a second color) when the mechanical actuator 103 is in a second position. The indicator light 104 may be tied to the power state of the optical light source, such that when the optical light source is powered, the indicator light 104 illuminates in the first configuration, and when the optical light source is not powered (or in a reduced power state) the indicator light 104 illuminates in the second configuration.

Protective enclosure 105 is a cover for manual release mechanism 108. In the example depicted, protective enclosure 105 includes a first wall 109, a second wall 110 opposite first wall 109, and a third wall 111 perpendicular to first wall 109 and second wall 110. The first wall 109 and the second wall 110 may be referred to as lateral walls, and the third wall 111 may be referred to as a top wall or a primary protection barrier or wall. Third wall 111 is coupled to first wall 109 and second wall 110, and the walls may be substantially perpendicular to one another. At least a portion of protective enclosure 105 is coupled to faceplate 101 (e.g., via one or more hinges or one or more sliding linear mechanical lifts, as discussed further below). While the protective enclosure 105 is depicted as being a rectangular prism, or portion thereof, in other examples, the protective enclosure may be rounded, spherical, cylindrical, or other shape. When protective enclosure 105 is covering manual release mechanism 108, the gap between third wall 111 and manual release mechanism 108 is small, preferably less than 0.25 inches.

Optical connector 106 is an optical connector that couples fiber 107 with a transceiver, a laser, an amplifier, or the like in a way that allows optical signals (e.g., light) to pass when the optical connector 106 is connected to the port of the faceplate 101. In some examples, optical connector 106 includes a square (SC) connector, a straight tip (ST) connector, a Lucent (LC) connector, or a ferrule (FC) connector. In some examples, optical connector 106 includes a housing and a ferrule (e.g., an alignment sleeve that holds the fiber in place).

Fiber 107 is an optical fiber. Fiber 107 includes one or more thin, flexible strands of glass or plastic that transmit light signals over distances. In some examples, fiber 107 includes an HCF. An HCF is a specialized type of optical fiber in which at least a portion of the core is hollow or filled with gas or air, often resulting in lower latency and reduced signal attenuation. The fiber 107 may be of various types of HCF fibers, such as photonic bandgap fibers (PGBFs), Bragg fibers, and/or Kagome fibers, among others.

In the example depicted, manual release mechanism 108 is a latch mechanism that allows for insertion and secure locking of optical connector 106 when coupled to a corresponding transceiver, port, receptacle, laser, optical amplifier, or the like. Manual release mechanism 108 is coupled to optical connector 106. Pressing down on this latch disengages the lock, allowing the user to remove optical connector 106. As such, preventing the manual release mechanism 108 from being depressed (or otherwise manually interacted with), also prevents the connector 106 from being removed from the faceplate 101 or storage container 102.

For instance, the receptacle in the faceplate 101 may include one or more retention prongs or detents, and the connector 106 may similarly include one or more retention prongs or detents. When the connector 106 is inserted into the receptacle, a portion of the connector deflects allowing the retention prongs/detents of the connector 106 to move past the retention prongs/detents of the receptable. Once fully inserted, the connector 106 returns to its non-deflected position, and the retention prongs/detents prevent the connector 106 from being removed from the receptable until the manual release mechanism 108 is engaged. In other examples, the manual release mechanism 108 may be a threaded or screw mechanism that secures the connector 106 to the receptacle by twisting the manual release mechanism 108. In such examples, manual interaction with the manual release mechanism 108 is again required to release the connector 106 from the receptacle.

Figure 2A:
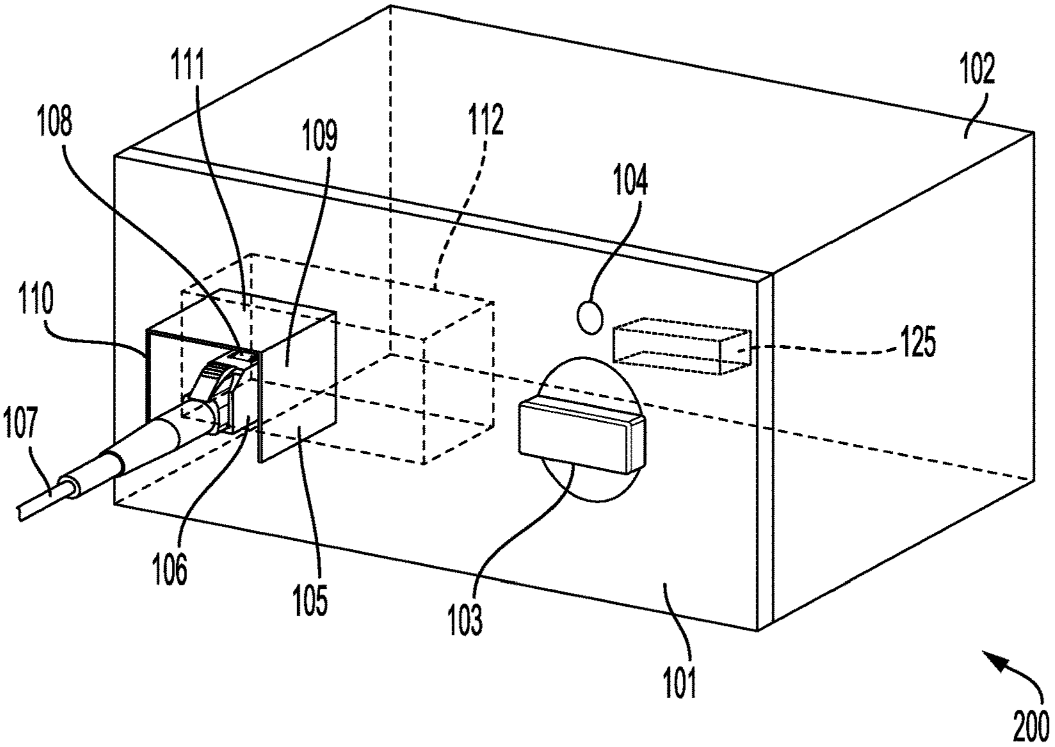
FIG. 2A illustrates an example optical system in accordance with aspects of the disclosure.

FIG. 2A illustrates an example optical system 200 in accordance with aspects of the disclosure. Optical system 200 includes faceplate 101, storage container 102, mechanical actuator 103, indicator light 104, protective enclosure 105, optical connector 106, fiber 107, manual release mechanism 108, optical amplifier 112, and controller 125. It should be noted that components of previous or later figures may be combined with components of FIG. 2A without departing from the present disclosure. Repeated discussion of similar aspects from previous figures is omitted for brevity.

Optical amplifier 112 is a device that amplifies an optical signal directly, without the need to first convert it to an electrical signal. Optical amplifier 112 provides or receives optical signals to or from optical connector 106. Accordingly, the optical amplifier 112 provides an output of amplified light that may be dangerous if viewed directly by a technician.

Manual interaction with, or manipulation of, mechanical actuator 103 from one position to another position causes the optical amplifier 112 to turn on, off, or change the intensity of (e.g., reduce power of) optical signals provided by optical amplifier 112. For example, when mechanical actuator 103 is in a first position, optical amplifier 112 provides one or more optical signals to fiber 107 via optical connector 106, and when mechanical actuator 103 is in a second position, optical amplifier 112 receives a termination signal or a power reduction signal, or power to the optical amplifier 112 is removed or reduced (e.g., via a switch). The mechanical actuator 103 may include one or more electrical contacts that allow for the state of the mechanical actuator 103 to be detected or otherwise utilized. In some examples, the mechanical actuator 103 operates as a switch or relay. For instance, when the mechanical actuator 103 is in a first position, a circuit is closed and power is allowed to flow to the optical amplifier 112. When the mechanical actuator 103 is in a second position, the circuit is opened and power cannot flow to the optical amplifier 112. In other examples, controller 125 (e.g., at least one processor and memory) may be incorporated into the storage container 102. The controller 125 may control the operation of the optical amplifier 112. In such examples, the controller may receive a signal from, or detect a position of, the mechanical actuator 103 indicating the position of the mechanical actuator 103. The controller 125 then uses the position signal for the mechanical actuator 103 to change the state of the optical amplifier 112 (e.g., powered, unpowered, or low-power state).

Figure 2B:
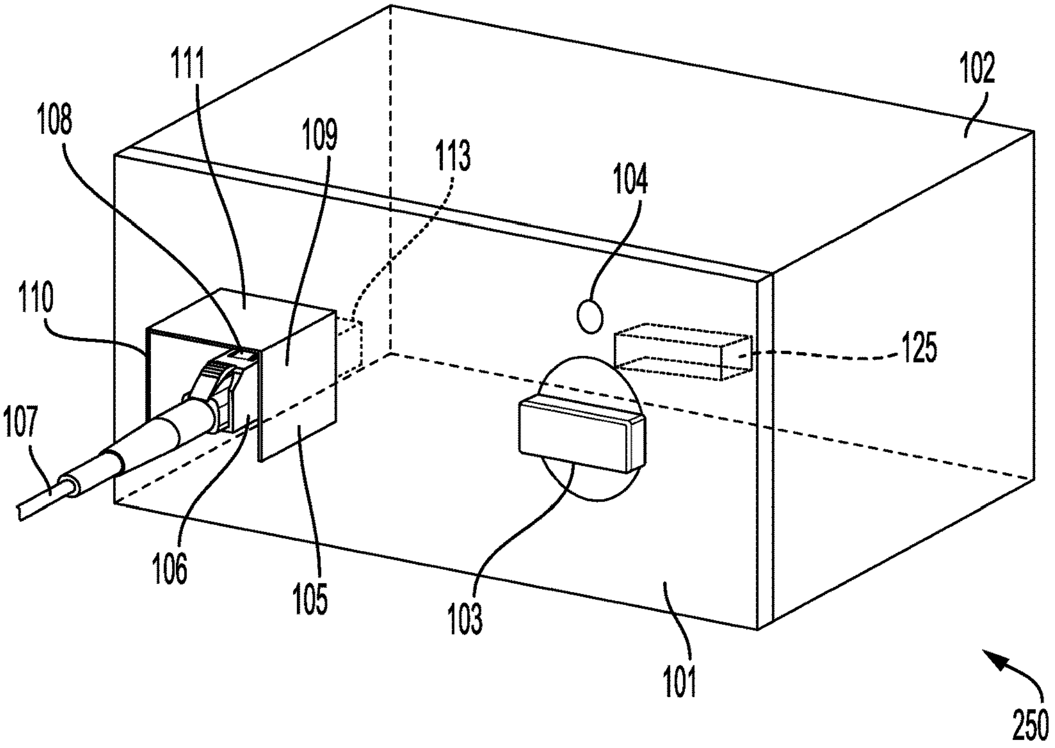
FIG. 2B illustrates an example optical system in accordance with aspects of the disclosure.

FIG. 2B illustrates an example optical system 250 in accordance with aspects of the disclosure. Optical system 250 includes faceplate 101, storage container 102, mechanical actuator 103, indicator light 104, protective enclosure 105, optical connector 106, fiber 107, manual release mechanism 108, laser 113, and controller 125. It should be noted that components of previous or later figures may be combined with components of FIG. 2B without departing from the present disclosure. Repeated discussion of similar aspects from previous figures is omitted for brevity.

Laser 113 serves as a light source that generates optical signals carrying data. Laser 113 provides a focused and intense beam of light, which enables higher data rates and longer transmission distances over fiber 107. In some examples, laser 113 operates in the infrared wavelength range (e.g., 1310 nm or 1550 nm) to minimize loss and dispersion of the signal as it travels through fiber 107. Laser 113 provides optical signals to fiber 107 via optical connector 106. Similar to the optical amplifier 112, the laser 113 generates optical signals that may be dangerous when directly viewed.

The mechanical actuator 103 may operate in substantially the same manner as discussed above with respect to system 200 in FIG. 2A with the exception that the position of the mechanical actuator 103 changes the power state of the laser 113 rather than the optical amplifier 112. For instance, a change in position of the mechanical actuator 103 causes a change in state of the laser 113, which may be caused directly through switching or through the processing of position signals by controller 125.

In some examples, a transceiver is included with, or is coupled to, laser 113. In some examples, the transceiver is configured to receive the optical connector 106. In some examples, the transceiver is coupled to faceplate 101, storage container 102, or both (e.g., in a receptacle). The transceiver includes both laser 113 and a photodetector for receiving optical signals. When transmitting data, the optical output from the laser 113 is modulated (e.g., light output is switched on and off, or varied in intensity) to encode information. Once modulated, laser 113 provides optical signals to fiber 107.

One skilled in the art may appreciate that other types of optical device or optical signal sources configured to provide/receive optical signals may be used in place of optical amplifier 112 or laser 113. That is, optical amplifier 112 and laser 113 are merely illustrative examples of an optical device configured to provide/receive optical signals to/from fiber 107 or 107 via optical connector.

Figure 3A:
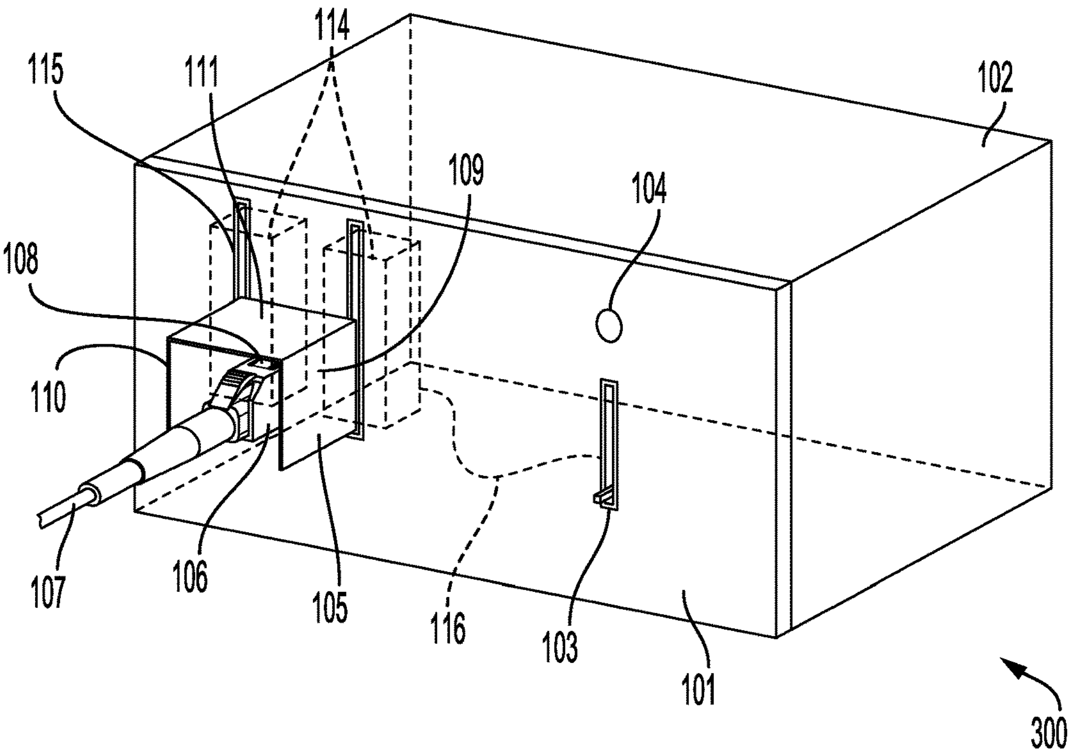
FIG. 3A illustrates an example optical system in accordance with aspects of the disclosure.

FIG. 3A illustrates an example optical system 300 in accordance with aspects of the disclosure. Optical system 300 includes faceplate 101, storage container 102, mechanical actuator 103, indicator light 104, protective enclosure 105, optical connector 106, fiber 107, manual release mechanism 108, mechanical devices 114, sliding linear mechanical lifts 115, and wiring 116. It should be noted that components of previous or later figures may be combined with components of FIG. 3A without departing from the present disclosure. Repeated discussion of similar aspects from previous figures is omitted for brevity.

FIG. 3A is provided to show one example of a mechanical actuator 103 and motion of the protective enclosure 105. Accordingly, while not depicted in FIG. 3A for clarity of discussion, the system 300 also includes an optical device (e.g., optical amplifier 112, laser 113) that is concurrently controlled by movement of the mechanical actuator 103.

In the example depicted, mechanical actuator 103 is a sliding linear mechanical lever. A user lifts or presses down on the lever, which provides electrical signals through wiring 116 to mechanical devices 114.

Mechanical devices 114 may include one or more electro-mechanical devices configured to produce linear motion (e.g., a linear actuator) to move protective enclosure 105. For instance, the mechanical devices 114 may include motors, servos, piezoelectric actuators, etc. Mechanical devices 114 are coupled to faceplate 101, storage container 102, or both. Mechanical devices 114 are coupled to sliding linear mechanical lifts 115 such that the mechanical devices 114 are capable of causing movement of the linear mechanical lifts 115. When electrical signals are received from mechanical actuator 103 via wires 116, mechanical devices 114 move up or down, pushing sliding linear mechanical lifts 115 up or down. For instance, a change in position of the mechanical actuator 103 causes activation of the mechanical devices 114, which move the position of the sliding linear mechanical lifts 115 and, consequently, the protective enclosure 105.

Sliding linear mechanical lifts 115 are devices configured to move an object linearly along a slot path of the sliding linear mechanical lifts 115. Sliding linear mechanical lifts 115 are coupled to protective enclosure 105 to lift or lower protective enclosure 105 based on force applied (e.g., from mechanical devices 114, or from mechanical linkage as described in FIG. 3B, below). Accordingly, as the mechanical actuator 103 is slid upwards, the protective enclosure 105 also moves upwards and exposes the manual release mechanism 108. When the mechanical actuator 103 is slid downwards, the protective enclosure 105 moves downwards and covers the manual release mechanism 108—preventing removal of the connector 106.

In some examples, a user interacts with mechanical actuator 103, which concurrently moves the protective enclosure 105 and causes an optical amplifier or laser (e.g., optical amplifier 112, laser 113) to turn on, off, or change (e.g., reduce power of) optical signals provided by the optical amplifier or laser. For example, when mechanical actuator 103 moves to a first position (e.g., a down position, a covered position), mechanical devices 114 move protective enclosure 105 down via sliding linear mechanical lifts 115 to cover manual release mechanism 108, and the optical amplifier or laser provides one or more optical signals to fiber 107 via optical connector 106. In some other examples, when mechanical actuator 103 moves to a second position (e.g., an up position, uncovered position), the optical amplifier or laser receives a termination signal or a power reduction signal, or power to the optical amplifier or laser is removed or reduced (e.g., via a switch), and mechanical devices 114 move protective enclosure 105 up via sliding linear mechanical lifts 115 to uncover manual release mechanism 108.

Figure 3B:
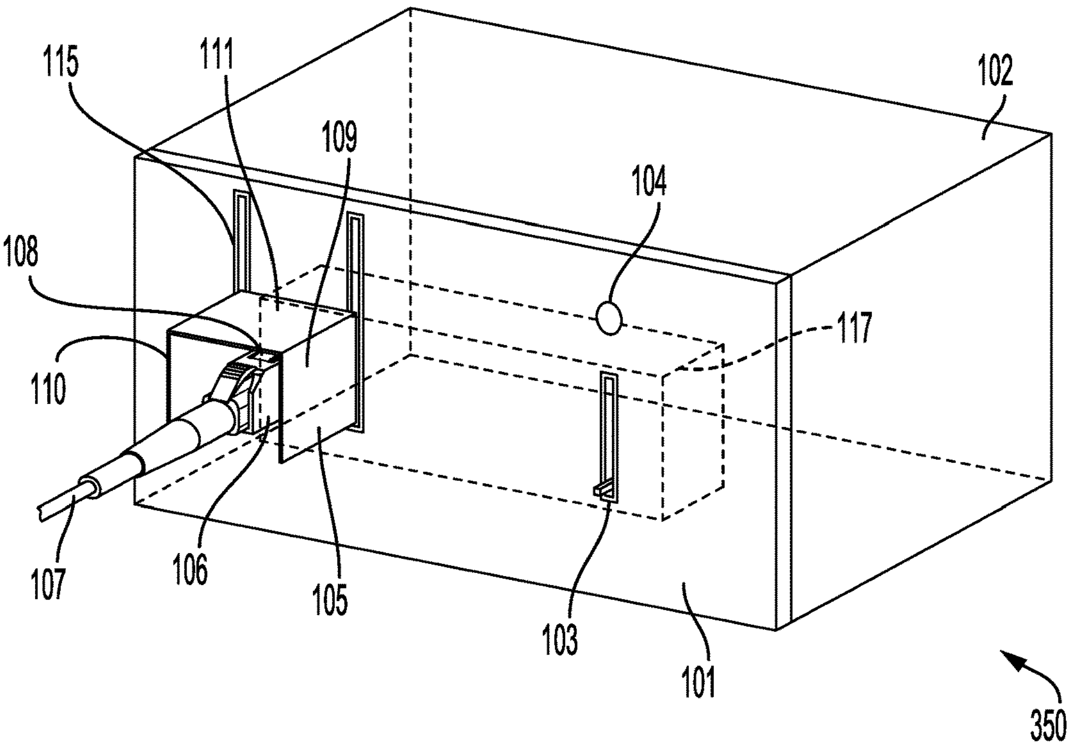
FIG. 3B illustrates an example optical system in accordance with aspects of the disclosure.

FIG. 3B illustrates an example optical system 350 in accordance with aspects of the disclosure. Optical system 350 includes faceplate 101, storage container 102, mechanical actuator 103, indicator light 104, protective enclosure 105, optical connector 106, fiber 107, manual release mechanism 108, sliding linear mechanical lifts 115, and mechanical linkage 117. It should be noted that components of previous or later figures may be combined with components of FIG. 3B without departing from the present disclosure. Repeated discussion of similar aspects from previous figures is omitted for brevity.

FIG. 3B is provided to show one example of a mechanical actuator 103 and motion of the protective enclosure 105. Accordingly, while not depicted in FIG. 3B for clarity of discussion, the system 350 also includes an optical device (e.g., optical amplifier 112, laser 113) that is concurrently controlled by movement of the mechanical actuator 103.

In contrast to the system 300 in FIG. 3A, the system 350 in FIG. 3B uses a mechanical linkage 117 to couple the mechanical actuator 103 with the sliding linear mechanical lifts 115 and the protective enclosure 105. Accordingly, rather than providing electrical signal to activate a motor or other electro-mechanical actuator, the mechanical energy from movement of the mechanical actuator 103 causes movement of the protective enclosure 105. This more direct mechanical connection provides further reliability and robustness to the system. In addition, the direct mechanical connection provides for an additional tactile feel when manipulating the mechanical actuator 103 that allows for better assurance that the protective enclosure 105 is fully closed.

Mechanical linkage 117 may include an assembly of rigid links connected by joints to form a closed or open chain, serving as a means of transmitting motion, force, or energy between mechanical actuator 103 and protective enclosure 105. Utilizing pivots, levers, rods, or a combination of these, mechanical linkage 117 may perform a variety of tasks, including amplification or reduction of movement, changing the direction of motion, or translating one form of motion into another. For example, for translating rotational motion of a dial or knob or linear motion of mechanical actuator 103 (e.g., a sliding linear mechanical lever) to rotational (e.g., a hinge, see FIGS. 4A-B) or linear motion (e.g., sliding linear mechanical lifts 115) of protective enclosure 105, a series of interconnected levers or gears may be employed. The translation of either rotational or linear to other rotational or linear motion using mechanical linkage may involve multiple components such as gears, crankshafts, levers, and rods. In the example depicted, mechanical linkage 117 is coupled to mechanical actuator 103 and sliding linear mechanical lifts 115. It should be noted that mechanical actuator 303-*b* may be linear (e.g., a sliding linear mechanical lever) or rotational (e.g., a dial, a knob), even though a sliding linear mechanical lever is illustrated in the present example.

For example, if mechanical actuator 103 is a dial or knob, as the dial or knob rotates, the dial or knob may drive a crank arm in a circular path, which is then connected via a rod to another crank or lever system. This second lever system can, through an arrangement like a rack and pinion, convert the rotational motion into linear motion, moving the sliding linear mechanical lifts 115 up or down.

In another example, mechanical linkage 117 includes a crankshaft, which serves to convert rotational to linear motion (e.g., when mechanical actuator 103 is a dial or knob). As the dial or knob turns, it rotates a crankshaft. The crankshaft has a connecting rod that is connected to a slider. As the crankshaft rotates, the rod moves the slider back and forth in a linear path, moving the sliding linear mechanical lifts 115 up or down.

In another example, mechanical linkage 117 includes a pinion gear coupled to mechanical actuator 103 (e.g., a dial or knob). As the dial or knob rotates, the pinion gear moves along a straight, toothed part called a 'rack', converting the rotational motion to linear motion, moving the sliding linear mechanical lifts 115 up or down.

In another example, mechanical linkage 117 includes a cam coupled to mechanical actuator 103 (e.g., a dial or knob). A cam is a rotating element with an irregular shape. As the cam rotates, a follower rides along the edge of the cam. The shape of the cam dictates how the follower moves. The follower can move in a straight line, converting rotational to linear motion, moving the sliding linear mechanical lifts 115 up or down.

In another example, mechanical linkage 117 includes a lead screw. In some examples, mechanical actuator 103 (e.g., a dial or knob) is connected to a gear that meshes with the threads of the lead screw. When the dial or knob rotates, the gear turns the lead screw, and a nut that is threaded onto the lead screw is moved linearly along the length of the screw, moving the sliding linear mechanical lifts 115 up or down.

In another example, mechanical linkage 117 includes one or more bar members configured to couple the sliding lever of mechanical actuator 103 to sliding linear mechanical lifts 115 to lift the protective enclosure 105 when mechanical actuator 303-*b* is pushed up, and lower the protective enclosure 105 when mechanical actuator 103 is pushed down.

In some examples, a user interacts with mechanical actuator 103 which concurrently controls a light source (e.g., optical amplifier 112, laser 113) to turn on, off, or change (e.g., reduce power of) optical signals provided by the light source, and provides mechanical energy from the user interaction to sliding linear mechanical lifts 115 via mechanical linkage 117 using one or more of the configurations for mechanical linkage 117 described above. For example, when mechanical actuator 103 moves to a first position (e.g., a down position), mechanical linkage 117 that is coupled to mechanical actuator 103 provides mechanical movement to move sliding linear mechanical lifts 115 down to cover manual release mechanism 108, and the optical amplifier or laser provides one or more optical signals to fiber 107 via optical connector 106. In some other examples, when mechanical actuator 103 moves to a second position (e.g., an up position), the optical amplifier or laser receives a termination signal or a power reduction signal, or power to the optical amplifier or laser is removed or reduced (e.g., via a switch), and mechanical linkage 117 that is coupled to mechanical actuator 103 provides mechanical movement to move sliding linear mechanical lifts 115 up to uncover manual release mechanism 108.

Figure 4A:
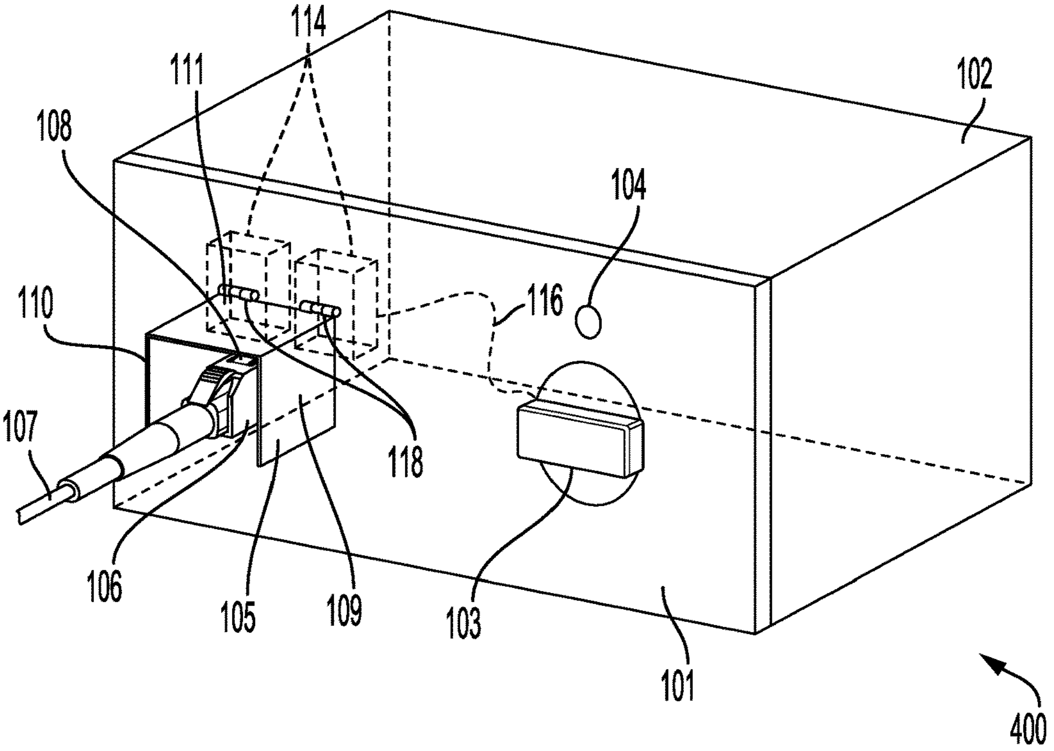
FIG. 4A illustrates an example optical system in accordance with aspects of the disclosure.

FIG. 4A illustrates an example optical system 400 in accordance with aspects of the disclosure. Optical system 400 includes faceplate 101, storage container 102, mechanical actuator 103, indicator light 104, protective enclosure 105, optical connector 106, fiber 107, manual release mechanism 108, mechanical devices 114, hinges 118, and wiring 116. It should be noted that components of previous or later figures may be combined with components of FIG. 4A without departing from the present disclosure. Repeated discussion of similar aspects from previous figures is omitted for brevity.

In the example system 300, mechanical devices 114 are one or more device(s) configured to produce rotational motion to move protective enclosure 105 (e.g., see FIGS. 5A and 5B). Mechanical devices 114 include electric motors, stepper motors, servo motors, watch mechanisms, and the like. In some examples, mechanical devices 114 are coupled to faceplate 101, storage container 102, or both. In some examples, mechanical devices 114 are coupled to hinges 118. When electrical signals are received based on the position of the mechanical actuator 103 via wires 116, mechanical devices 114 rotate, rotating hinges 118, which rotate protective enclosure 105. In some examples, mechanical devices 114 rotate protective enclosure 105 without hinges 118.

Hinges 118 are provided to support rotational movement. Hinges 118 are coupled to protective enclosure 105 and are configured to rotate protective enclosure 105 based on force applied (e.g., from mechanical devices 114, or from mechanical linkage as describe in FIG. 4B).

In some examples, a user interacts with mechanical actuator 103 which provides controls an optical amplifier or laser (e.g., optical amplifier 112, laser 113) to turn on, off, or change (e.g., reduce power of) optical signals provided by the optical amplifier or laser, and provides other electrical signals to mechanical devices 114 via wires 116 to rotate protective enclosure 105. For example, when mechanical actuator 403-*a* moves to a first position, mechanical devices 114 rotate protective enclosure 105 down via hinges 118 to cover manual release mechanism 108, and the optical amplifier or laser provides one or more optical signals to fiber 107 via optical connector 106. In some other examples, when mechanical actuator 103 moves to a second position, the optical amplifier or laser receives a termination signal or a power reduction signal, or power to the optical amplifier or laser is removed or reduced (e.g., via a switch), and mechanical devices 114 move protective enclosure 105 up via hinges 118 to uncover manual release mechanism 108.

Figure 4B:
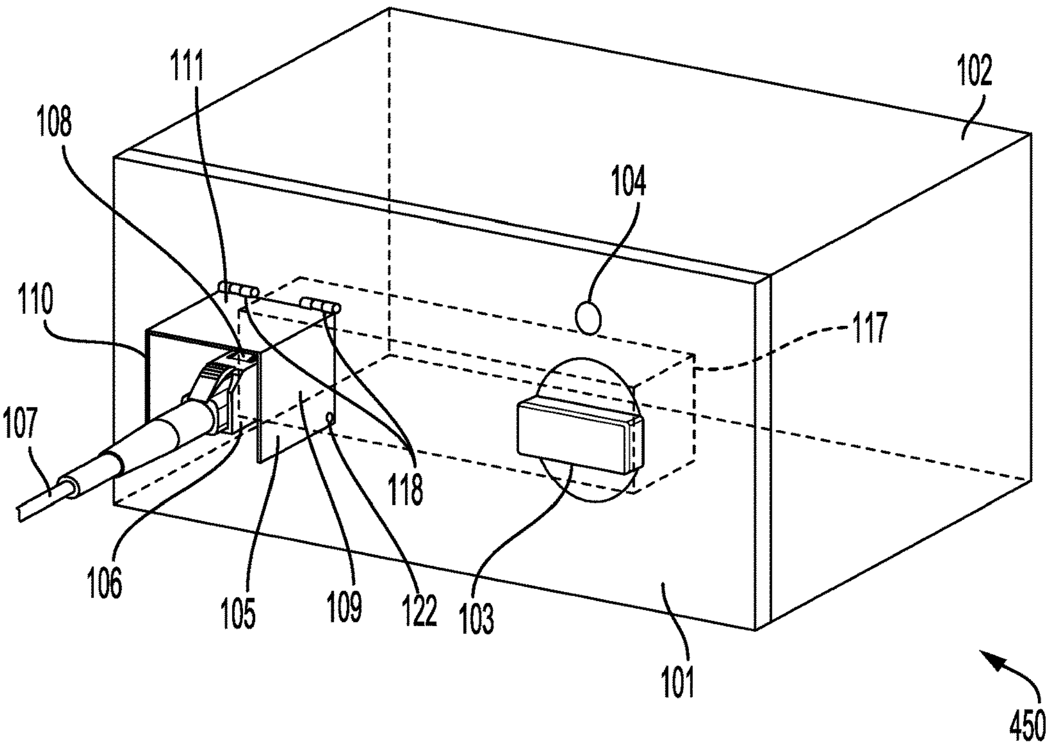
FIG. 4B illustrates an example optical system in accordance with aspects of the disclosure.

FIG. 4B illustrates an example optical system 450 in accordance with aspects of the disclosure. Optical system 450 includes faceplate 101, storage container 102, mechanical actuator 103, indicator light 104, protective enclosure 105, optical connector 106, fiber 107, manual release mechanism 108, hinges 118, and mechanical linkage 117. It should be noted that components of previous or later figures may be combined with components of FIG. 4B without departing from the present disclosure. Repeated discussion of similar aspects from previous figures is omitted for brevity.

In contrast to the system 400 in FIG. 4A, the system 450 in FIG. 4B uses a mechanical linkage 117 to couple the mechanical actuator 103 with the protective enclosure 105 to cause the rotational motion of the protective enclosure 105. Accordingly, rather than providing electrical signal to activate a motor or other electro-mechanical actuator, the mechanical energy from movement of the mechanical actuator 103 causes movement of the protective enclosure 105. Such a direct mechanical connection provides further reliability and robustness to the system. In addition, the direct mechanical connection provides for an additional tactile feel when manipulating the mechanical actuator 103 that allows for better assurance that the protective enclosure 105 is fully closed.

Mechanical linkage 117 may include an assembly of rigid links connected by joints to form a closed or open chain, serving as a means of transmitting motion, force, or energy between mechanical actuator 103 and protective enclosure 105. Utilizing pivots, levers, rods, or a combination of these, mechanical linkage 117 may perform a variety of tasks, including amplification or reduction of movement, changing the direction of motion, or translating one form of motion into another. For example, for translating rotational motion of mechanical actuator 103 (e.g., a dial, a knob) or linear motion of mechanical actuator 103 (e.g., if mechanical actuator 103 is a sliding linear mechanical lever) to rotational (e.g., hinges 118) or linear motion (e.g., sliding linear mechanical lifts 115 in FIG. 3) of protective enclosure 105, a series of interconnected levers or gears may be employed. The translation of rotational to either rotational or linear motion using mechanical linkage may involve multiple components such as gears, crankshafts, levers, and rods. Mechanical linkage 117 is coupled to mechanical actuator 103 and hinges 118.

In an example, as mechanical actuator 103 rotates, mechanical actuator 103 drives a crank arm in a circular path, which is then connected via a rod to another crank or lever system. This second lever system can either maintain the rotational motion, rotating the hinges 118 in a manner to cause the protective enclosure 105 to rotate up or down.

In another example, mechanical linkage 117 includes a series of interconnected spur gears. When mechanical actuator 103 is rotated, it turns a gear attached to the backside of the mechanical actuator 103. This first gear meshes with a second gear mounted on a separate axis. The rotational motion of the first gear causes the second gear to rotate as well, transferring the motion to hinges 118. The gear ratio between the first and second gear can be adjusted to either speed up or slow down the rotational motion at hinges 118.

In another example, mechanical linkage 117 includes bevel gears, which can change the direction of rotation (e.g., rotation of mechanical actuator 103 to the rotation of hinges 118). As mechanical actuator 103 rotates, it turns a bevel gear that meshes with a second bevel gear oriented at a 90-degree angle to the first.

In another example, mechanical linkage 117 includes a universal joint (e.g., may be used when the axes of the input and output rotation are not parallel, as may be the case with mechanical actuator 103 and hinges 118). This kind of linkage can translate the rotational motion around bends or corners, such as when translating rotational motion from mechanical actuator 103 to hinges 118.

In the example system 450, the protective enclosure 105 may also include a locking receiver 122. The locking receiver 122 may be in the form of a hole, port, depression or other type of receiving element. The locking receiver 122 provides for an ability to have the protective enclosure 105 locked in the closed or protected position until the mechanical actuator 103 is moved to the unprotected position. For instance, the protective enclosure 105 remains locked such that manual manipulation of the protective enclosure 105 cannot open the protective enclosure 105 (without breaking one or more components of the protective enclosure 105). As an example, when the mechanical actuator 103 is changed from the unprotected (e.g., off) position to the protected position (e.g., on) position, the movement of the mechanical actuator 103 causes a rod or other structure to protrude into the locking receiver 122 to prevent movement of the protective enclosure 105 when in the protected position. While the locking receiver 122 is depicted only in this example, a similar locking receiver 122 may be included in any of the protective enclosure 105 of the other examples described herein.

In some examples, a user interacts with mechanical actuator 103 which concurrently controls the light source (e.g., optical amplifier 112, laser 113) to turn on, off, or change (e.g., reduce power of) optical signals provided by the light source, and provides such mechanical energy from the user interaction to hinges 118 via mechanical linkage 117 using one or more of the configurations for mechanical linkage 117 described above. For example, when mechanical actuator 103 rotates to a first position, mechanical linkage 117 that is coupled to mechanical actuator 103 provides mechanical movement to rotate hinges 118 down to cover manual release mechanism 108, and the optical amplifier or laser provides one or more optical signals to fiber 107 via optical connector 106. In some other examples, when mechanical actuator 103 rotates to a second position, the optical amplifier or laser receives a termination signal or a power reduction signal, or power to the optical amplifier or laser is removed or reduced (e.g., via a switch), and mechanical linkage 117 that is coupled to mechanical actuator 103 provides mechanical movement to rotate hinges 118 up to uncover manual release mechanism 108.

FIG. 5A illustrates an example optical system 500 in accordance with aspects of the disclosure. Optical system 500 includes faceplate 101, mechanical actuator 103, indicator light 104, protective enclosure 105, optical connector 106, fiber 107, manual release mechanism 108, and fourth wall 119. It should be noted that components of previous or later figures may be combined with components of FIG. 5A without departing from the present disclosure. Repeated discussion of similar aspects from previous figures is omitted for brevity.

Fourth wall 119 is an additional wall of protective enclosure 105. In the example depicted, the fourth wall 119 includes an opening 120 that allows space for fiber 107. The opening 120 may be part of a slot extending to the bottom of the fourth wall 119 such that the fiber 107 can slide through the slot as the protective enclosure 105 moves from the unprotected position to the protected position. Fourth wall 119 may be perpendicular to the other walls of protective enclosure 105, including first wall 109, second wall 110, and third wall 111. In the depicted example, fourth wall 119 is coupled to first wall 109, second wall 110, and third wall 111. Fourth wall 119 further prevents a user from forcibly pulling out fiber 107 or optical connector 106. The fourth wall may also be referred to as front barrier or a fiber-covering barrier. Again, while the walls depicted in FIG. 5A are planar and part of a rectangular prism forming the protective enclosure 105, in other examples, the walls may be curved and/or part of another three-dimension figure, such as a spherical cover, a conical cover, a cylindrical cover, etc.

FIG. 5B illustrates an example optical system 550 in accordance with aspects of the disclosure. Optical system 550 includes faceplate 101, mechanical actuator 103, indicator light 104, protective enclosure 105, and receptacle 121. It should be noted that components of previous or later figures may be combined with components of FIG. 5B without departing from the present disclosure. Repeated discussion of similar aspects from previous figures is omitted for brevity.

Receptacle 121 includes an opening in faceplate 101, and in some cases, protruding into storage container behind faceplate 101. Receptacle 121 is configured to receive an optical connector. In some cases, receptacle 121 is configured to house, or be coupled to, a transceiver, which is configured to receive the optical connector.

Figure 6:
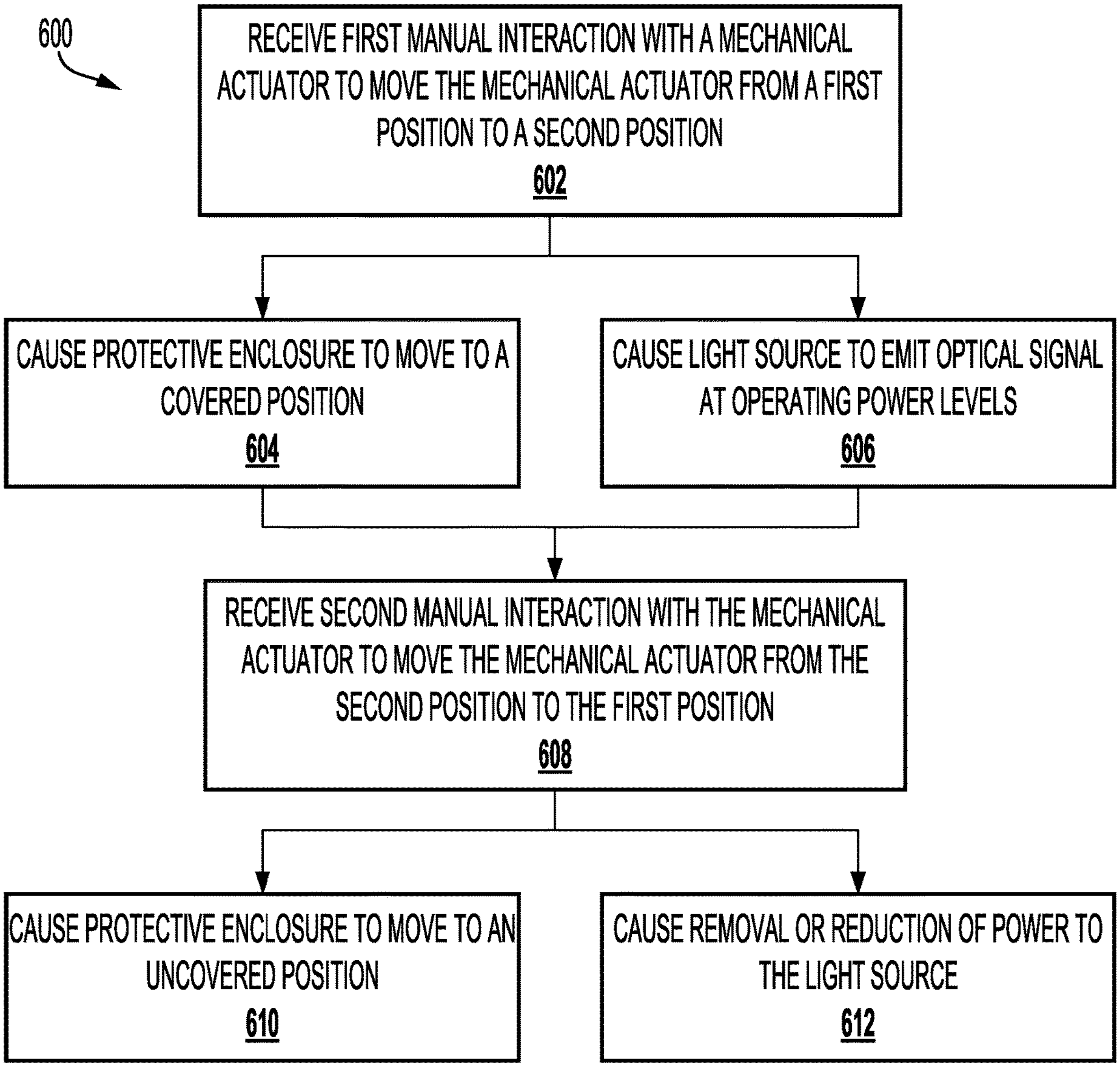
FIG. 6 illustrates an example method in accordance with aspects of the disclosure.

FIG. 6 illustrates an example method 600 in accordance with aspects of the disclosure. Method 600 includes one or more operations 602-606. Additional operations may be included, operations may be excluded, and/or operations may be arranged in different orders without departing from the scope of the disclosure.

At operation 602, a first manual interaction with a mechanical actuator of a fiber-optic transmission system is received. The first manual interaction moves the mechanical actuator from a first position to a second position. The first position may be considered an “off” position and the second position may be considered an “on” position. The manual interaction may be a translations/linear movement and/or a rotation movement, among other types of interaction, depending on the structure of the mechanical actuator (e.g., slider, knob, push buttons, switch).

In response to the mechanical actuator moving from the first position to the second position, operations 604 and 606 are performed. In some examples, operations 604 and 606 are performed substantially concurrently.

At operation 604, a protective enclosure is caused to be moved to a covered position (e.g., protected position). The movement may be rotational and/or linear, among other types of movement. In addition, while the movement in the examples discussed above has been primarily up-and-down motion, the motion may be in any suitable direction such that the protective enclosure moves to the covered position. When in the covered position, the protective enclosure covers the manual release mechanism a connector that is couple to (e.g., plugged into) the fiber-optic transmission system. Operation 604 may include generating a signal that controls an electro-mechanical device (e.g., servo, motor) that, in response to the signal, moves the protective enclosure. In other examples, operation 604 may be more passive in that the mechanical energy from the first manual interaction more directly causes the movement of the protective enclosure via mechanical linkage between the mechanical actuator and the protective enclosure.

At operation 606, the light source (e.g., optical amplifier, laser) is caused to emit optical signals at operating power levels, such as full power levels. For instance, the light source is powered or powered on. In some examples, movement of the mechanical actuator to the second position operates as a switch by connecting contacts to close a circuit to allow power to flow to the light source. In other examples, the second position of the mechanical actuator is detected by a controller of the system, and the controller provides the power to the light source (and/or allows power to the be provided to the light source).

At operation 608, a second manual interaction with the mechanical actuator is received. The second manual interaction moves the mechanical actuator from the second position (e.g., on position) to the first position (e.g., off position). The second mechanical interaction may be substantially similar to the first manual interaction but in the opposite direction.

In response to the mechanical actuator moving from the second position to the first position, operations 610 and 612 are performed. In some examples, operations 610 and 612 are performed substantially concurrently.

At operation 610, the protective enclosure is caused to be moved from the covered position (e.g., protected position) to an uncovered position (e.g., an unprotected position). The movement may be rotational and/or linear, among other types of movement. In addition, while the movement in the examples discussed above has been primarily up-and-down motion, the motion may be in any suitable direction such that the protective enclosure moves to the uncovered position. When in the uncovered position, the manual release mechanism is uncovered and accessible to the user. For instance, the user may interact with the manual release mechanism to release the connector and remove the connector from the system (e.g., remove the connector from a receptacle of the faceplate). Operation 610 may include generating a signal that controls an electro-mechanical device (e.g., servo, motor) that, in response to the signal, moves the protective enclosure. In other examples, operation 610 may be more passive in that the mechanical energy from the first manual interaction more directly causes the movement of the protective enclosure via mechanical linkage between the mechanical actuator and the protective enclosure.

At operation 12, power to the light source (e.g., optical amplifier, laser) is removed or reduced. For instance, the light source is powered off or changed to a power level below the operational power level. In some examples, movement of the mechanical actuator to the first position operates as a switch by disconnecting contacts to open a circuit to prevent power from flowing to the light source. In other examples, the second position of the mechanical actuator is detected by a controller of the system, and the controller provides the power to the light source (and/or allows power to the be provided to the light source).

In an aspect, the technology relates to a fiber-optic communication system. The system includes a faceplate; a receptacle in the faceplate that receives an optical fiber connector; an optical light source that provides one or more optical signals through the receptacle based at least in part on receiving one or more electrical signals; and a protective enclosure, coupled to the faceplate, having a covered position and an uncovered position. When the protective enclosure is in the covered position, the protective enclosure covers a manual release mechanism of the optical fiber connector, and when the protective enclosure is in the uncovered position, the protective enclosure uncovers the manual release mechanism of the optical fiber connector. The system further includes a mechanical actuator coupled to the faceplate, having a first position and a second position. When the mechanical actuator is in the first position, the protective enclosure is in the covered position and the optical light source is powered on, and when the mechanical actuator is in the second position, the protective enclosure is in the uncovered position and power to the optical light source is removed or reduced.

In an example, the system further includes a mechanical linkage that couples to the protective enclosure to the mechanical actuator, wherein the mechanical linkage translates mechanical energy from movement of the mechanical actuator between the first position and the second position to mechanical energy to move the protective enclosure between the covered position and the uncovered position. In a further example, the protective enclosure moves linearly between the covered position and the uncovered position when the mechanical actuator moves between the first position and the second position. In another example, the system further includes a hinge that couples the protective enclosure to the faceplate, wherein the protective enclosure moves rotationally, about the hinge, between the covered position and the uncovered position when the mechanical actuator moves between the first position and the second position. In still another example, when the mechanical actuator is moved from the first position to the second position, a first movement signal is provided to an electro-mechanical device to move the protective enclosure to the uncovered position, and when the mechanical actuator is moved from the second position to the first position, a second movement signal is provided to the electro-mechanical device to move the protective enclosure to the covered position. In yet another example, the protective enclosure moves linearly between the covered position and the uncovered position when the mechanical actuator moves between the first position and the second position. In a further example, the system further includes a hinge that couples the protective enclosure to the faceplate, wherein the protective enclosure moves rotationally, about the hinge, between the covered position and the uncovered position when the mechanical actuator moves between the first position and the second position. In yet another example, the mechanical actuator comprises a sliding linear mechanical lever. In still another example, the mechanical actuator comprises a dial or a knob. In another example, the optical light source comprises an optical amplifier. In still yet another example, the optical light source comprises a laser.

In another aspect, the technology relates to a system that includes a faceplate; a mechanical actuator coupled to the faceplate; a receptacle for receiving an optical fiber connector, wherein the receptacle is coupled to the faceplate; and a protective enclosure coupled to the faceplate, adjacent to the receptacle, and moveable responsive to movement of the mechanical actuator, comprising a primary protection barrier covering a mechanical release mechanism of the optical fiber connector when the protective enclosure is in a covered position.

In an example, the protective enclosure further comprises two lateral walls coupled to the primary protection barrier. In another example, the protective enclosure further comprises a fiber-covering barrier coupled to the primary protection barrier. In another example, the system further includes one or more hinges coupled to the protective enclosure. In yet another example, the system further includes one or more sliding linear mechanical lifts coupled to the protective enclosure.

In another aspect, the technology relates to a method for prevent injury from optical emissions during interactions with a fiber optic transmission system. The method includes receiving a first manual interaction with a mechanical actuator to move the mechanical actuator from a first position to a second position; in response to the mechanical actuator moving from the first position to the second position: causing a protective enclosure to move to a covered position, wherein when in the covered position, the protective enclosure covers a manual release mechanism to prevent manual interaction with the manual release mechanism; and causing a light source to emit optical signals at operating power levels.

In an example, the method further includes receiving, a second manual interaction with the mechanical actuator to move the mechanical actuator from the second position to the first position; in response to the mechanical actuator moving from the second position to the first position: cause the protective enclosure to move to an uncovered position, wherein when in the uncovered position, the protective enclosure uncovers the manual release mechanism and allows manual interaction with the manual release mechanism; and cause removal or reduction of power to the light source. In another example, the movement of the protective enclosure is linear movement. In still another example, the movement of the protective enclosure is rotational movement.

Aspects of the present disclosure, for example, are described above with reference to block diagrams and/or operational illustrations of methods and systems according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Unless stated otherwise, terms such as "first" and "second" are used to arbitrarily distinguish between the elements such terms describe. Thus, these terms are not necessarily intended to indicate temporal or other prioritization of such elements. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A fiber-optic communication system, comprising:
- a faceplate;
- a receptacle in the faceplate that receives an optical fiber connector;
- an optical light source that provides one or more optical signals through the receptacle based at least in part on receiving one or more electrical signals;
- a protective enclosure, coupled to the faceplate, having a covered position and an uncovered position, wherein:
  - when the protective enclosure is in the covered position, the protective enclosure covers a manual release mechanism of the optical fiber connector, and
  - when the protective enclosure is in the uncovered position, the protective enclosure uncovers the manual release mechanism of the optical fiber connector; and
- a mechanical actuator coupled to the faceplate, having a first position and a second position, wherein:
  - when the mechanical actuator is in the first position, the protective enclosure is in the covered position and the optical light source is powered on, and
  - when the mechanical actuator is in the second position, the protective enclosure is in the uncovered position and power to the optical light source is removed or reduced, and wherein movement of the mechanical actuator between the first position and the second position concurrently moves the protective enclosure between the covered position and the uncovered position and changes a power state of the optical light source.

2. The system of claim 1, further comprising a mechanical linkage that couples to the protective enclosure to the mechanical actuator, wherein the mechanical linkage translates mechanical energy from movement of the mechanical actuator between the first position and the second position to mechanical energy to move the protective enclosure between the covered position and the uncovered position.

3. The system of claim 2, wherein the protective enclosure moves linearly between the covered position and the uncovered position when the mechanical actuator moves between the first position and the second position.

4. The system of claim 2, further comprising a hinge that couples the protective enclosure to the faceplate, wherein the protective enclosure moves rotationally, about the hinge, between the covered position and the uncovered position when the mechanical actuator moves between the first position and the second position.

5. The system of claim 1, wherein when the mechanical actuator is moved from the first position to the second position, a first movement signal is provided to an electro-mechanical device to move the protective enclosure to the uncovered position, and when the mechanical actuator is moved from the second position to the first position, a second movement signal is provided to the electro-mechanical device to move the protective enclosure to the covered position.

6. The system of claim 5, wherein the protective enclosure moves linearly between the covered position and the uncovered position when the mechanical actuator moves between the first position and the second position.

7. The system of claim 5, further comprising a hinge that couples the protective enclosure to the faceplate, wherein the protective enclosure moves rotationally, about the hinge, between the covered position and the uncovered position when the mechanical actuator moves between the first position and the second position.

8. The system of claim 1, wherein the mechanical actuator comprises a sliding linear mechanical lever.

9. The system of claim 1, wherein the mechanical actuator comprises a dial or a knob.

10. The system of claim 1, wherein the optical light source comprises an optical amplifier.

11. The system of claim 1, wherein the optical light source comprises a laser.

12. A system, comprising:

a faceplate;

a mechanical actuator coupled to the faceplate, the mechanical actuator having a first position and a second position;

a receptacle for receiving an optical fiber connector, wherein the receptacle is coupled to the faceplate; and a protective enclosure coupled to the faceplate, adjacent to the receptacle, and moveable responsive to movement of the mechanical actuator, comprising a primary protection barrier covering a mechanical release mechanism of the optical fiber connector when the protective enclosure is in a covered position, wherein when the mechanical actuator is moved from the first position to the second position, a first movement signal is provided to an electro-mechanical device to move the protective enclosure to an uncovered position, and when the mechanical actuator is moved from the second position to the first position, a second movement signal is provided to the electro-mechanical device to move the protective enclosure to the covered position.

13. The system of claim 12, wherein the protective enclosure further comprises two lateral walls coupled to the primary protection barrier.

14. The system of claim 12, wherein the protective enclosure further comprises a fiber-covering barrier coupled to the primary protection barrier.

15. The system of claim 12, further comprising one or more hinges coupled to the protective enclosure.

16. The system of claim 12, further comprising one or more sliding linear mechanical lifts coupled to the protective enclosure.

17. A method for prevent injury from optical emissions during interactions with a fiber optic transmission system, the method comprising:

receiving a first manual interaction with a mechanical actuator to move the mechanical actuator from a first position to a second position;

in response to the mechanical actuator moving from the first position to the second position, concurrently:

causing a protective enclosure to move to a covered position, wherein when in the covered position, the protective enclosure covers a manual release mechanism to prevent manual interaction with the manual release mechanism; and causing a light source to emit optical signals at operating power levels.

18. The method of claim 17, further comprising:

receiving, a second manual interaction with the mechanical actuator to move the mechanical actuator from the second position to the first position;

in response to the mechanical actuator moving from the second position to the first position:

cause the protective enclosure to move to an uncovered position, wherein when in the uncovered position, the protective enclosure uncovers the manual release mechanism and allows manual interaction with the manual release mechanism; and cause removal or reduction of power to the light source.

19. The method of claim 17, wherein the movement of the protective enclosure is linear movement.

20. The method of claim 17, wherein the movement of the protective enclosure is rotational movement.

* * * * *